United States Patent
Walker (10) Patent No.: US 10,938,117 B2
(45) Date of Patent: Mar. 2, 2021

(54) CROSS-LINK SATELLITE WITH SPHERICAL REFLECTORS

(71) Applicant: ARIZONA BOARD OF REGENTS ON BEHALF OF THE UNIVERSITY OF ARIZONA, Tucson, AZ (US)

(72) Inventor: Christopher K. Walker, Tucson, AZ (US)

(73) Assignee: Arizona Board of Regents on Behalf of The University of Arizona, Tucson, AZ (US)

(*) Notice: Subject to any disclaimer, the term of this patent is extended or adjusted under 35 U.S.C. 154(b) by 0 days.

(21) Appl. No.: 16/492,561

(22) PCT Filed: Mar. 9, 2018

(86) PCT No.: PCT/US2018/021872
§ 371 (c)(1),
(2) Date: Sep. 9, 2019

(87) PCT Pub. No.: WO2018/165626
PCT Pub. Date: Sep. 13, 2018

(65) Prior Publication Data
US 2020/0044354 A1    Feb. 6, 2020

Related U.S. Application Data

(60) Provisional application No. 62/469,344, filed on Mar. 9, 2017.

(51) Int. Cl.
*H01Q 15/16* (2006.01)
*H01Q 1/28* (2006.01)
(Continued)

(52) U.S. Cl.
CPC .............. *H01Q 15/16* (2013.01); *H01Q 1/28* (2013.01); *H01Q 1/288* (2013.01); *H01Q 3/26* (2013.01);
(Continued)

(58) Field of Classification Search
None
See application file for complete search history.

(56) References Cited

U.S. PATENT DOCUMENTS

3,192,529 A    6/1965  Chatelain
3,206,749 A    9/1965  Chatelain
(Continued)

*Primary Examiner* — Vibol Tan
(74) *Attorney, Agent, or Firm* — Blank Rome LLP (57) ABSTRACT

A cross-link satellite with spherical reflectors that can communicate in up to five substantially orthogonal directions, and thus can be included in a satellite constellation, that can be built and deployed at a lower cost than conventional satellite antennas in conventional satellite constellations. The cross-link satellite includes a communications hub in the center of a spherical balloon. The spherical balloon includes a transparent surface and three or more reflective surfaces. The reflective surfaces include a continuous reflective surface (e.g., for communicating with the ground), a first polarized reflective surface, and a second polarized reflective surface opposite the first polarized reflective surface. The first polarized reflective surface and the second polarized reflective surface are orthogonally polarized, enabling the cross-link satellite to communicate with satellites on either side of the cross-link satellite as part of a satellite constellation.

20 Claims, 6 Drawing Sheets

(51) Int. Cl.
  *H01Q 15/24* (2006.01)
  *H01Q 3/26* (2006.01)
  *H04B 7/185* (2006.01)

(52) U.S. Cl.
  CPC .......... *H01Q 15/161* (2013.01); *H01Q 15/24* (2013.01); *H04B 7/18521* (2013.01)

(56) References Cited

U.S. PATENT DOCUMENTS

| | | |
|---|---|---|
| 3,594,802 A | 7/1971 | Koob |
| 4,757,323 A | 7/1988 | Duret et al. |
| 5,459,475 A | 10/1995 | Shen et al. |
| 5,652,597 A | 7/1997 | Caille |
| 9,666,948 B1 * | 5/2017 | Rao ........................ H01Q 21/28 |
| 9,787,392 B2 * | 10/2017 | Baudoin ............ H04B 7/18521 |
| 10,199,711 B2 * | 2/2019 | Walker ................... H01Q 1/288 |
| 10,461,432 B1 * | 10/2019 | Walker ................... H01Q 19/32 |
| 10,680,310 B2 * | 6/2020 | Walker ................... H01Q 1/082 |
| 2014/0152492 A1 | 6/2014 | Zimmerman et al. |
| 2017/0019055 A1 | 1/2017 | Thales |
| 2019/0235225 A1 * | 8/2019 | Walker ................ B64G 1/1007 |

* cited by examiner

CROSS-LINK SATELLITE WITH SPHERICAL REFLECTORS

CROSS REFERENCE TO RELATED APPLICATIONS

This application is U.S. national stage application of International Application No. PCT/US2018/021872, which claims priority to U.S. Prov. Pat. Appl. No. 62/469,344, filed Mar. 9, 2017. This application is also related to U.S. patent application Ser. No. 15/667,226, filed Aug. 2, 2017, which claims priority to U.S. Prov. Pat. Appl. No. 62/369,994, filed Aug. 2, 2016; PCT Pat. Appl. No. PCT/US16/42462, filed Jul. 15, 2016, which claims priority to U.S. Prov. Pat. Appl. No. 62/193,474, filed Jul. 16, 2015; and U.S. patent application Ser. No. 15/154,760, filed May 13, 2016, which claims priority to U.S. Prov. Pat. Appl. No. 62/161,033, filed May 13, 2015. All of the aforementioned patent applications are hereby incorporated by reference in their entireties.

STATEMENT REGARDING FEDERALLY SPONSORED RESEARCH

None

BACKGROUND

Satellite constellations are an important part of our communications infrastructure. The Iridium satellite constellation, for example, provides voice and data coverage to satellite phones, pagers and integrated transceivers over the Earth's entire surface.

Satellite constellations include a number of satellites with coordinated ground coverage, operating together under shared control, that are synchronized so that they overlap well in coverage, meaning that at least one of the satellites in the constellation is visible above the local horizon at any time anywhere on the Earth's surface. The global positioning satellite (GPS) constellation, for example, includes 24 satellites distributed equally among six circular orbital planes. The Iridium satellite constellation, for example, includes 66 active satellites in six orbital planes, and additional spare satellites to serve in case of failure. Each orbital plane includes 11 satellites (not counting spares), each spaced 30 degrees apart.

In addition to communicating with locations on the ground, satellites in a satellite constellation also communicate with neighboring satellites. Cross-links between satellites in the satellite constellation allow information received by a satellite to be delivered to a destination outside the current coverage area of that satellite (e.g., on the other side of the globe). Satellites in the Iridium satellite constellation, for example, communicate with neighboring satellites via Ka band inter-satellite links. Each satellite can have four inter-satellite links: one each to neighbors fore and aft in the same orbital plane, and one each to satellites in neighboring planes to either side.

Conventional high gain space antennas are expensive to build, transport into space, and place in orbit because of their complexity, size, weight, and inability to collapse in three dimensions. Iridium satellites, for example, can cost $60-70 million.

U.S. patent application Ser. No. 15/154,760 discloses a satellite antenna that can be built and deployed at a much lower cost than a conventional satellite antenna.

Figure 1A:
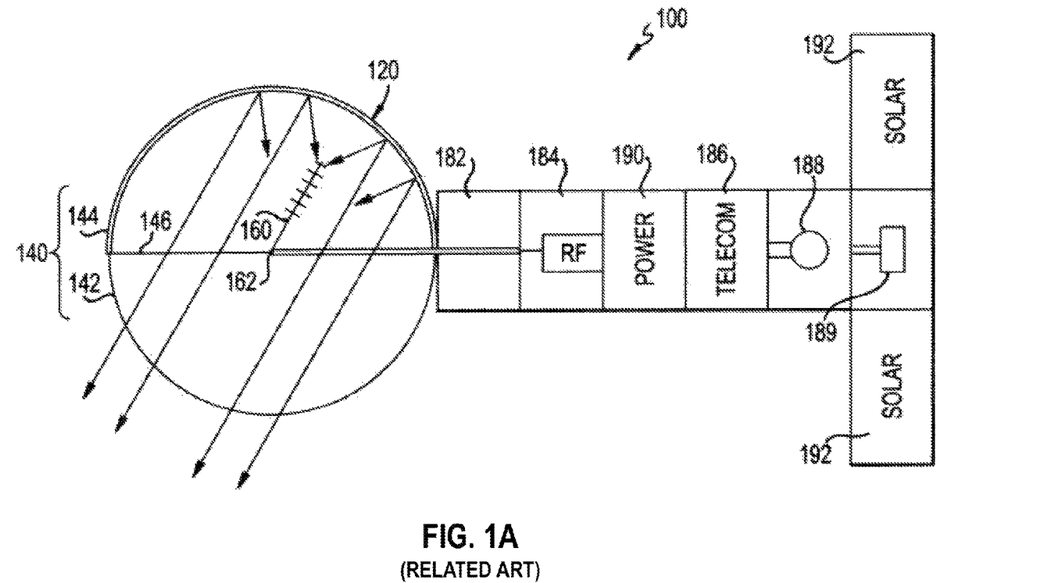
FIG. 1A is a diagram illustrating the spherical balloon reflector satellite as deployed in space according to U.S. patent application Ser. No. 15/154,760.

FIG. 1A is a diagram illustrating the spherical balloon reflector satellite 100 with a large balloon reflector antenna 120 as deployed in space according to U.S. patent application Ser. No. 15/154,760. The balloon reflector antenna 120 includes a spherical balloon 140, which includes a surface transparent to electromagnetic waves 142 and a reflective surface 144 opposite the transparent surface 142. (The balloon 140 may also include one or more dielectric support curtains 146 to help the balloon 140 keep its spherical shape.) The spherical balloon reflector satellite 100 also includes a balloon reflector canister 182, an RF module 184, a telecommunications module 186, a pitch reaction wheel 188, a roll reaction wheel 189, a power module 190, and solar cells 192.

The balloon reflector antenna 120 includes a feed system 160, which may be one or more feedhorns, one or more planar antennas, one or more spherical correctors such as a quasi-optical spherical corrector or a line feed (as illustrated in FIG. 1), or any other suitable device that receives electromagnetic waves that are reflected off the reflective surface 144 or emits electromagnetic waves that are reflected off the reflective surface 144.

When the balloon reflector antenna 120 receives a signal (e.g., from the ground), the signal passes through the transparent surface 142 and encounters the reflective surface 144, which focuses the signal into the feed system 160. When the balloon reflector antenna 220 transmits a signal (e.g., to the ground), the signal is emitted by the feed system 160 and encounters the reflective surface 144, which directs the signal through the transparent surface 142.

As shown in FIG. 1A, a spherical reflective surface, such as the reflective surface 144, focuses parallel rays to a line (as opposed to a parabolic reflective surface, which focuses parallel rays to a point). The simplest "corrector" for this spherical aberration is a line feed.

Figure 1B:
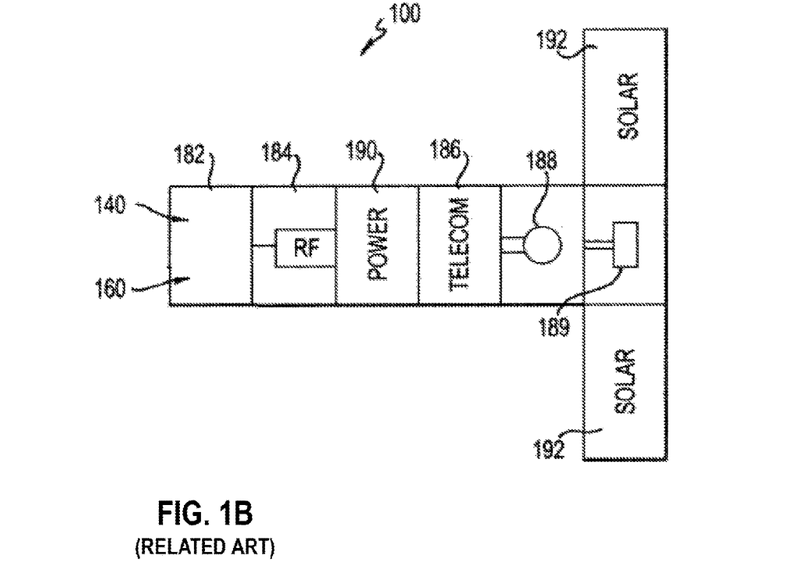
FIG. 1B is a diagram illustrating the spherical balloon reflector satellite of FIG. 1A as stowed for launch.

FIG. 1B is a diagram illustrating the spherical balloon reflector satellite 100 with the spherical balloon 140 and the feed system 160 stowed for launch in the balloon reflector canister 182. In some embodiments, a small (e.g., 1-2 meter) spherical balloon 140 can collapse so effectively as to stow in a single 1 U CubeSat unit. In another embodiment, even a large (e.g., 10 meter) spherical balloon 140 and associated RF payload can easily fit into existing rocket fairings.

The spherical balloon reflector satellite 100 provides a high gain antenna at a fraction of the cost to build and deploy a conventional satellite in a satellite constellation. However, as part of a satellite constellation, satellites are required to communicate with four adjacent satellites (in addition to communicating with the ground). The spherical balloon reflector antenna 100 cannot be deployed as part of a satellite constellation because it is incapable of communicating with two adjacent satellites on opposite sides of each other.

Referring back to FIG. 1A, the spherical balloon reflector antenna 100 can only transmit and receive signals in the direction of the transparent surface 142. If another satellite were located on the side with the reflective surface 144, signals received from that satellite would be reflected by the reflective surface 144 before reaching the feed system 160. Similarly, signals emitted by the spherical balloon reflector antenna 100 would be directed away from that satellite by the reflective surface 144 before reaching that satellite.

Accordingly, there is a need for a satellite antenna that can communicate in up to five substantially orthogonal directions that can be built and deployed at a lower cost than conventional satellite antennas in conventional satellite constellations.

SUMMARY

In order to overcome those and other drawbacks with conventional satellite antennas, there is provided a cross-link satellite that includes a communications hub in the center of a spherical balloon. The spherical balloon includes a transparent surface and three or more reflective surfaces. The reflective surfaces include a continuous reflective surface (e.g., for communicating with the ground), a first polarized reflective surface, and a second polarized reflective surface opposite the first polarized reflective surface.

The first polarized reflective surface and the second polarized reflective surface are orthogonally polarized. Orthogonally polarized reflective surfaces on opposite sides of the spherical balloon enable those surfaces to act as both a reflector and a transparent surface, which allows the cross-link satellite to communicate with cross-link satellites on opposite sides of the spherical balloon. Accordingly, cross-link satellites with orthogonally polarized reflective surfaces on opposite sides of a spherical balloon are capable of forming a satellite constellation. Meanwhile, the cost to deploy each cross-link satellite is significantly lower than conventional satellites in conventional satellite constellations, in part because the spherical balloon can be deflated and stowed during launch and inflated in orbit.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments, wherein.

DETAILED DESCRIPTION

Preferred embodiments are set forth in detail with reference to the drawings, in which like reference numerals refer to like elements or steps throughout.

Figure 2A:
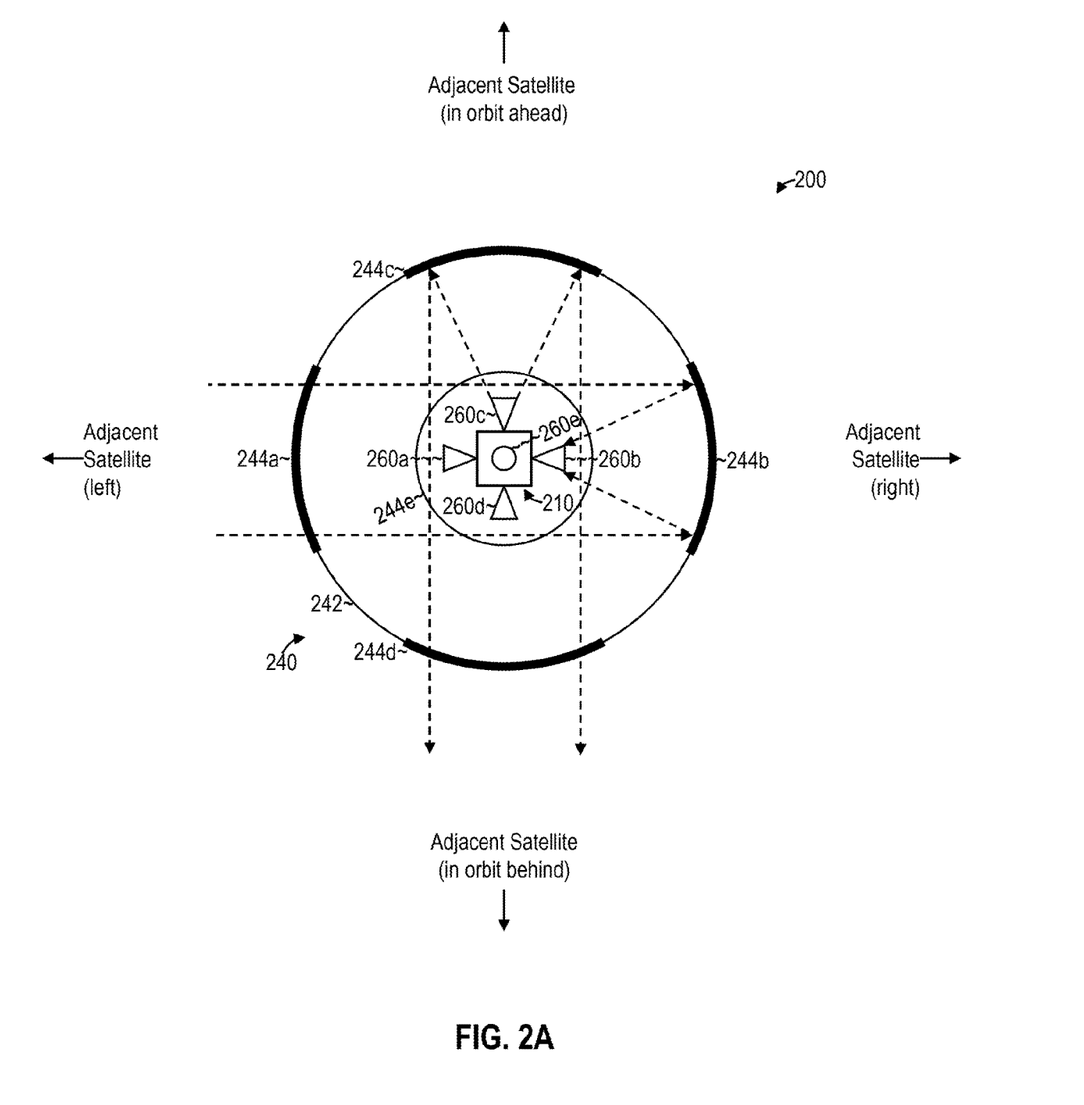
FIG. 2A is a diagram illustrating a cross-link satellite with spherical reflectors according to an exemplary embodiment.

FIG. 2A is a diagram illustrating a top-down view of a cross-link satellite 200 with spherical reflectors according to an exemplary embodiment.

As shown in FIG. 2A, the cross-link satellite 200 includes a communications hub 210 in the center of a spherical balloon 240. The spherical balloon 240 includes up to five reflective surfaces 244a through 244e (collectively referred to as reflective surfaces 244) while the remaining surface (transparent surface 242) is transparent to electromagnetic waves. The communications hub 210 includes up to five feed systems 260a through 260e (collectively referred to as feed systems 260) that each correspond with one of the five reflective surfaces 244a through 244e.

Each feed system 260 may be any suitable device that receives electromagnetic waves and/or emits electromagnetic waves. For example, the feed system 260 may include one or more feedhorns, one or more planar antennas, one or more spherical correctors such as a quasi-optical spherical corrector or one or more line feeds. The line feed may be a pivoting line feed (e.g., as described in U.S. patent application Ser. No. 15/154,760), an electronically steerable line feed (e.g., as described in PCT Pat. Appl. No. PCT/US16/42462), a collapsible vee antenna (e.g., as described in U.S. patent application Ser. No. 15/667,226), a collapsible line feed (e.g., as described in U.S. patent application Ser. No. 15/667,226), etc. Each feed system 260 may extend from the center of the spherical balloon 240 along one or more radial lines of the spherical balloon 240. In the preferred embodiment, described in detail below with reference to FIGS. 3 and 4, the feed system 260 includes an electronically steerable phased array line feed.

The spherical balloon 240 may be a collapsible and inflatable balloon of any size. In a preferred embodiment, the spherical balloon is a 2-3 meter diameter sphere. Because the spherical balloon 240 is collapsible and inflatable, the spherical balloon 240 may be stowed uninflated during launch and inflated when deployed. (For example, a small gas cylinder or a cylinder containing sublimating chemicals may be opened to inflate the spherical balloon 240. One or more dielectric support curtains may help ensure that the spherical balloon 240 maintains its spherical shape.) As a result, a collapsed balloon reflector antenna 220 can fit into otherwise unused space within the structure of a small satellite. A cross-link satellite 200 with a 2-3 meter spherical balloon 240, for example, can stow in one or more 1 U CubeSat units. Accordingly, the cost to launch and deploy the cross-link satellite 200 is significantly lower than the cost to deploy conventional satellites used in conventional satellite constellations.

The transparent surface 242 may be any flexible material with a low absorption rate (e.g., less than 1 percent) at the wavelength of interest, such as Mylar, Latex, or polyethylene. For example, the transparent surface 242 may be a flexible polymer such as an approximately 0.5 mil thick Mylar skin (e.g., a 0.5 mil±1 mil Mylar skin).

Each reflective surface 244 may be any suitable material that reflects electromagnetic waves at the wavelength of interest. For example, the reflective surface 244 may be an approximately 0.5 micron (e.g., 0.5 micron±0.1 micron) metallic coating applied to the transparent surface 242. Because the transparent surface 242 is thin and transparent, the metallic coating may be applied to the inside surface or the outside surface of the transparent surface 242 to form the reflective surface 244.

The reflective surface 244e is located on the top of the spherical balloon 240, opposite the Earth's surface. The reflective surface 244a is located substantially opposite the reflective surface 244b and the reflective surface 244c is located substantially opposite the reflective surface 244d. The reflective surfaces 244a through 244d are all located substantially orthogonal to the reflective surface 244e, along the circumference of the spherical balloon 240 that is substantially parallel to the Earth's surface.

The reflective surface 244e may be continuous (i.e., not polarized). The reflective surfaces 244a through 244d, on the other hand, are each polarized (i.e., vertically polarized, horizontally polarized, right hand circularly polarized, or left hand circularly polarized). Notably, reflective surfaces that are opposite each other are orthogonally polarized. For example, if the reflective surface 244a is vertically polarized, then the reflective surface 244b, which is opposite the reflective surface 244a, is horizontally polarized. In another example, if the reflective surface 244a is right hand circularly polarized, then the reflective surface 244b is left hand circularly polarized.

As described in detail below, because the reflective surface 244a and the opposite reflective surface 244b are each orthogonally polarized, waves with one polarization (for example, horizontally polarized signals) pass through the reflective surface 244a and are reflected by the opposite reflective surface 244b, while waves of another polarization (in this example, vertically polarized signals) pass through the reflective surface 244b and are reflected by the opposite reflective surface 244a.

The communications hub 210, which is not drawn to scale, may be approximately 1/10th the diameter of the spherical balloon 240 and is secured to the center of the spherical balloon 240 with internal, orthogonal dielectric sheets.

The feed system 260e transmits signals to the ground by emitting signals that encounter the reflective surface 244e, which directs those signals through the transparent surface 142 at the bottom of the spherical balloon 140 towards the Earth's surface. The feed system 260e receives signals from the ground that pass through the transparent surface 142 at the bottom of the spherical balloon 140 and encounter the reflective surface 244e, which focuses the signals into the feed system 260e.

As shown in FIG. 2A, the feed system 260b receives polarized signals from an adjacent satellite to the left that pass through the reflective surface 244a and encounter the reflective surface 244b, which focuses the signals into the feed system 260b. The feed system 260b also emits signals (not shown) with the same polarization that are also reflected by the reflective surface 244b and directed through the reflective surface 244a towards the adjacent satellite (to the left). If, for example, the reflective surface 244a is vertically polarized, then the reflective surface 244b is horizontally polarized and reflects horizontally polarized signals emitted by the feed system 260b and horizontally polarized signals received from the adjacent satellite (to the left).

The feed system 260a receives polarized signals (not shown) from an adjacent satellite to the right that pass through the reflective surface 244b and encounter the reflective surface 244a, which focuses the signals into the feed system 260a. The feed system 260a also emits signals (not shown) with the same polarization that are also reflected by the reflective surface 244a and directed through the reflective surface 244b towards the adjacent satellite (to the right). Continuing the previous example, since the reflective surface 244a is vertically polarized, the reflective surface 244a reflects vertically polarized signals emitted by the feed system 260a and vertically polarized signals received from the adjacent satellite (to the right).

As shown in FIG. 2A, the feed system 260c emits polarized signals that are reflected by the reflective surface 244c and directed through the reflective surface 244d towards the adjacent satellite in orbit behind. The feed system 260c also receives signals (not shown) with the same polarization from the adjacent satellite (in orbit behind) that pass through the reflective surface 244d and encounter the reflective surface 244c, which focuses the signals into the feed system 260c. If, for example, the reflective surface 244d is horizontally polarized, then the reflective surface 244c is vertically polarized and reflects vertically polarized signals emitted by the feed system 260c and vertically polarized signals received from the adjacent satellite (in orbit behind).

The feed system 260d also emits polarized signals (not shown) that are reflected by the reflective surface 244d and directed through the reflective surface 244c towards the adjacent satellite in orbit ahead. The feed system 260d also receives signals (not shown) with the same polarization from the adjacent satellite (in orbit ahead) that pass through the reflective surface 244c and encounter the reflective surface 244d, which focuses the signals into the feed system 260d. Continuing the previous example, since the reflective surface 244d is horizontally polarized, the reflective surface 244d reflects horizontally polarized signals emitted by the feed system 260d and horizontally polarized signals received from the adjacent satellite (in orbit ahead).

By arranging orthogonally polarized reflective surfaces 244 on opposite sides of the spherical balloon 240, each reflective surface 244 can act as both a reflector (for the associated feed system 260) and as a transparent surface (for the feed system 260 on the opposite side of the spherical balloon 240). Accordingly, the cross-link satellite 200 is able to communicate with satellites on up to four sides of the cross-link satellite 200 in addition to the ground. Therefore, the cross-link satellite 200 can be deployed as part of a satellite constellation.

Figure 2B:
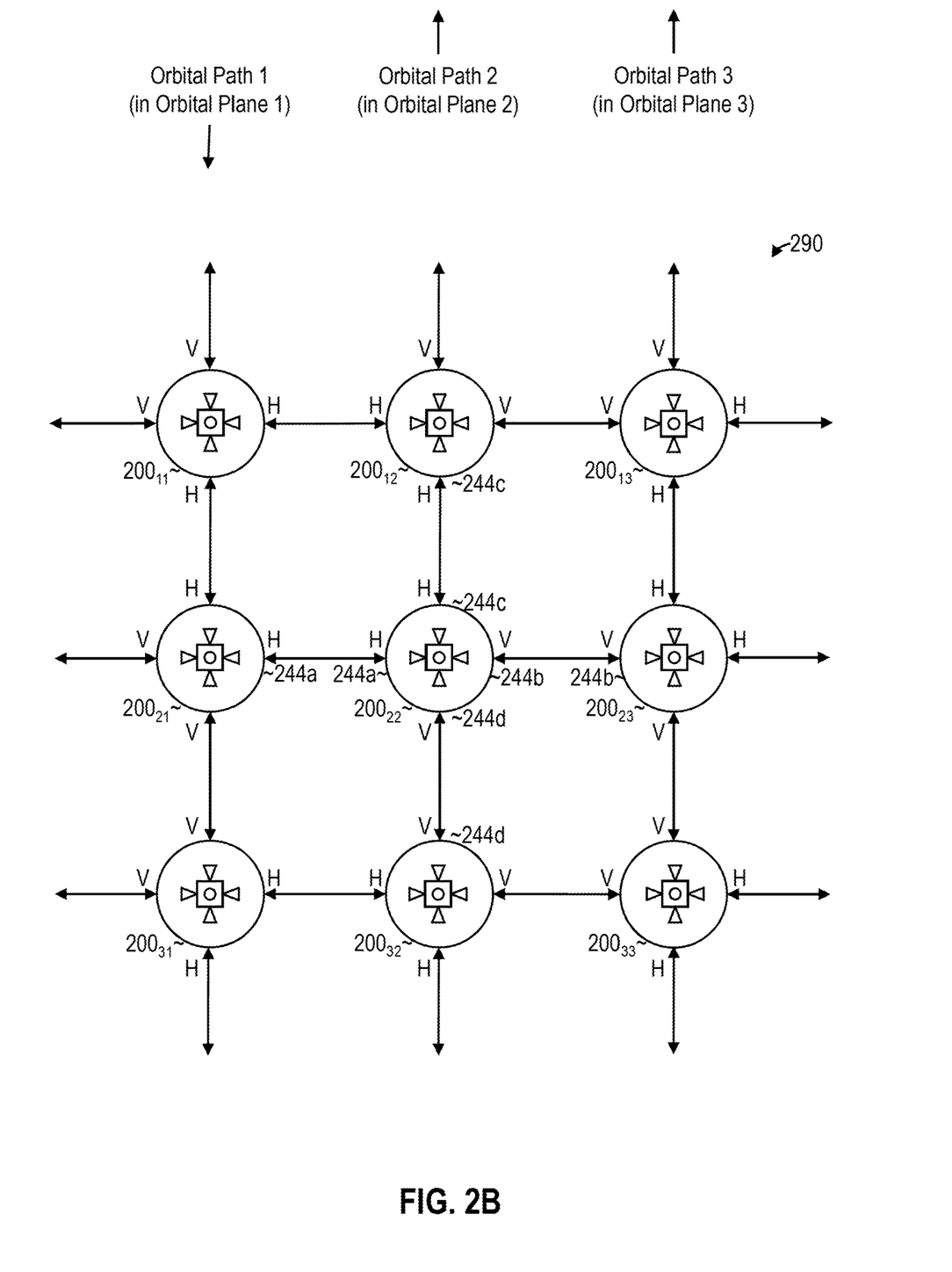
FIG. 2B is a diagram illustrating a constellation of cross-link satellites with spherical reflectors according to an exemplary embodiment.

FIG. 2B is a diagram of a top-down view of a constellation 290 of cross-link satellites 200 according to an exemplary embodiment.

As shown in FIG. 2B, the cross-link satellites 200 are arranged in an array, with satellites $200_{11}$, $200_{12}$, and $200_{13}$ in a first row; satellites $200_{21}$, $200_{22}$, and $200_{23}$ in a second row; satellites $200_{31}$, $200_{32}$, and $200_{33}$ in a third row; satellites $200_{11}$, $200_{21}$, and $200_{31}$ in a first column in orbital plane 1; satellites $200_{12}$, $200_{22}$, and $200_{32}$ in a second column in orbital plane 2; and satellites $200_{13}$, $200_{23}$, and $200_{33}$ in a third column in orbital plane 3.

The cross-link satellite $200_{22}$ is shown in additional detail. Because the reflective surface 244a is vertically polarized, it allows horizontally polarized signals to pass through to satellite $200_{21}$ and reflects vertically polarized signals toward the satellite $200_{23}$. Those vertically polarized signals then pass through (horizontally polarized) reflective surfaces 244b of the satellite $200_{22}$ and satellite $200_{23}$. Similarly, because the reflective surface 244d is horizontally polarized, it allows vertically polarized signals to pass through to satellite $200_{32}$ and reflects horizontally polarized signals toward the satellite $200_{12}$. Those horizontally polarized signals then pass through (vertically polarized) reflective surfaces 244c of the satellite $200_{22}$ and satellite $200_{23}$.

The beam angle necessary to maintain communication between satellites 200 in geostationary orbit or traveling along the same orbital path of the same orbital plane may stay relatively constant. However, even that relatively consistent beam angle may shift over time. Furthermore, the beam angle necessary to communicate with an adjacent cross-link satellite 200 in a neighboring orbital plane is constantly changing. In fact, because satellites 200 on neighboring orbital planes may be moving towards and away from the cross-link satellite 200, the cross-link satellite 200 may have to steer the beam of a feed system 260 to a new satellite 200 when the adjacent cross-link satellite 200 is no the closest satellite 200 in the neighboring orbital plane.

Therefore, in order to establish and maintain contact between each of the adjacent cross-link satellites 200, each of the feed systems 260 may be steerable. As shown in FIG. 1A, a feed system 160 may include a motorized mount 162 to steer an antenna beam by moving the feed system 160 radially. However, because the satellite 100 is deployed in space, pivoting the feed system 160 (or moving any other part of the satellite 100) will unintentionally cause the entire satellite 100 to move off course unless an equal and opposite force is applied. Therefore, in space-based applications, an electronically steerable feed system 260 is preferable.

Figure 3:
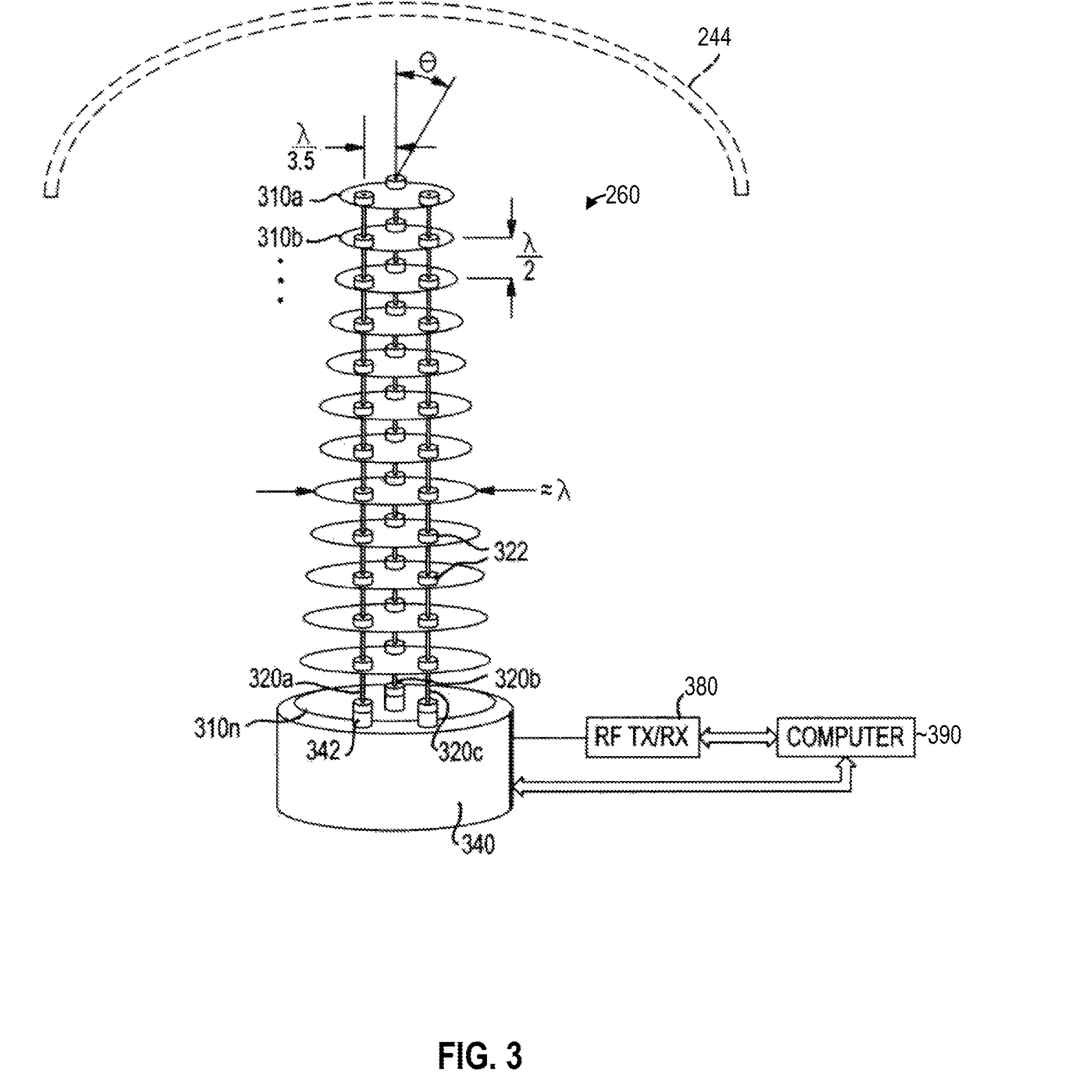
FIG. 3 is a diagram illustrating a phased array line feed according to an exemplary embodiment.

FIG. 3 is a diagram illustrating a phased array line feed 260 for a reflector antenna that operates at a wavelength of interest λ according to an exemplary embodiment.

As shown in FIG. 3, the phased array line feed 260 includes a plurality of (e.g., 3 or more) metallic rods 320a-320c and a phase/power switching matrix 340. The phase/power switching matrix 340 is electrically connected to each of the metallic rods 320a-320c, for example via coaxial connectors 342. The phased array line feed 260 may also include a plurality of metallic disks 310a-310n. The metallic rods 320a-320c may pass through the metallic discs 310a-310n, for example via coaxial feedthroughs 322.

A computer 390 controls the phase/power switching matrix 340. A radio 380 outputs signals for transmission by the phased array line feed 260 and receives signals received by the phased array line feed 260.

The metallic disks 310a-310n are substantially parallel. The metallic rods 320a-320c may be arranged in a circular pattern (embodiments with three metallic rods 320a-320c, for example, may form a triangular pattern). At the base of the phased array line feed 260, the metallic rods 320a-320c may be separated by a distance of approximately λ/3.5 center-to-center. The metallic rods 320a-320c may be substantially parallel and pass through each of the metallic disks 310a-310n substantially perpendicular to the metallic disks 310a-310n. For example, the rods may be angled inward at an angle of approximately 1 degree (e.g., 1 degree±0.1 degree).

In embodiments that include metallic discs 310a-310n, the metallic discs 310a-310n divide the phased array line feed 260 into a series of independent subarrays of λ/2 vertical antennas. In essence, each of the metallic discs 310a-310n acts as a ground plane for each of the subarrays. The emergent beam angle θ from each subarray is a function of the phasing within each subarray and the diameter of the metallic discs 310a-310n separating the subarrays. Illumination of a spherical reflector requires the emergent beam angle θ to vary along the length of the phased array line feed 260 with the largest emergent beam angle θ occurring at the end of the feed closest to the reflective surface 244. In the embodiment shown in FIG. 3, the emergent beam angle θ varies along the length of the line feed, for example from 19 degrees to 64 degrees.

Compared to a conventional, stationary line feed, the length of the phased array line feed 260 may be extended to intercept off-axis reflected rays that would otherwise be missed by the conventional line feed. To achieve scan angles of ±30 degrees, the length of the line feed may be approximately 12 percent (e.g., 12±1 percent) of the diameter of the spherical reflector being illuminated (e.g., the reflective surface 244).

In the embodiment illustrated in FIG. 3, the metallic disks 310a-310n may be equally spaced along the length of the metallic rods and the diameter of the metallic disks may decrease from the base to the vertex of the line feed. For example, the metallic disks 310a-310n may be separated by a distance of approximately λ/2 (e.g., λ/2±0.13) and the metallic discs may have a diameter of approximately λ/1.1 at the base of the line feed to approximately λ/1.8 at the vertex.

Figure 4:
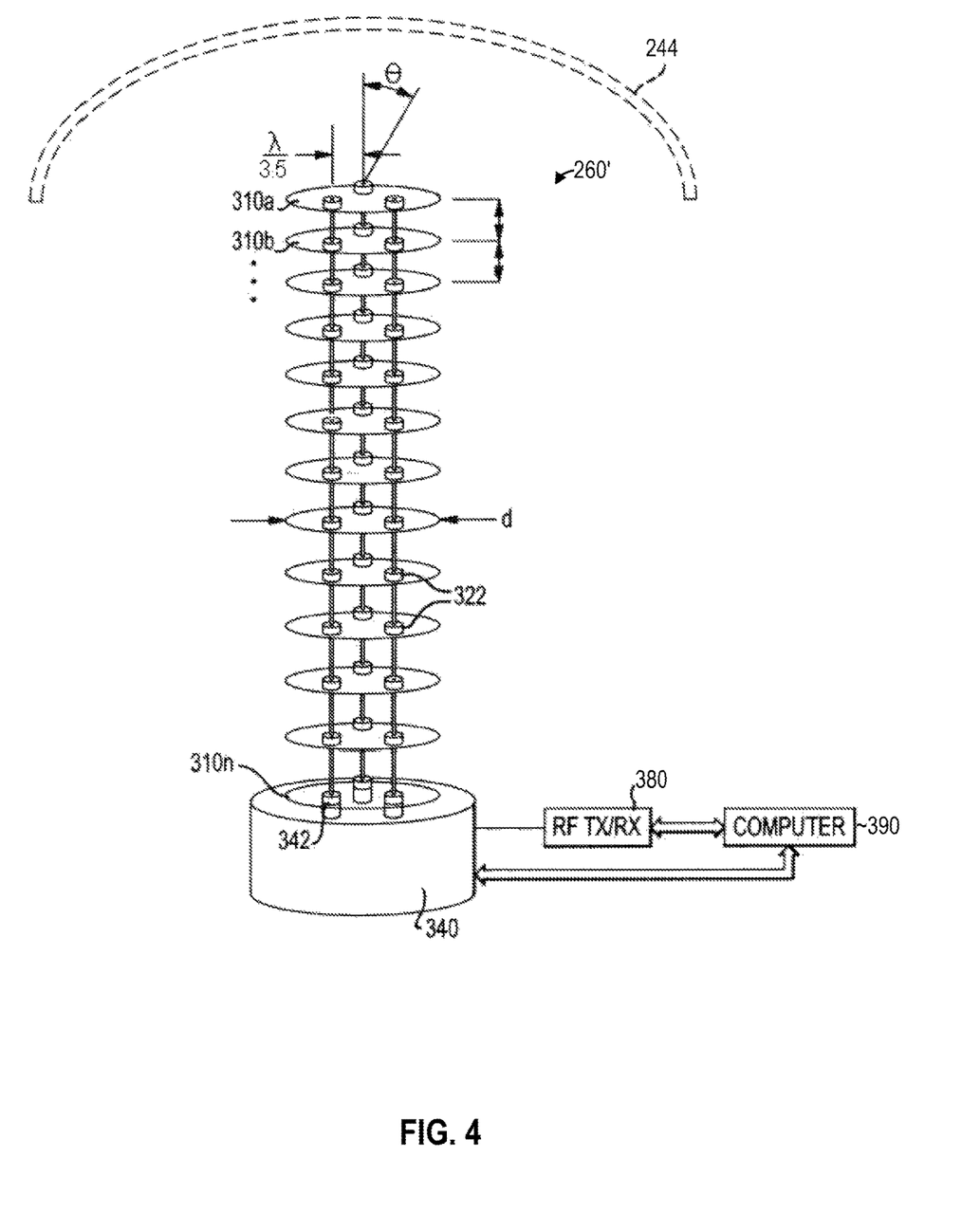
FIG. 4 is a diagram illustrating a phased array line feed according to another exemplary embodiment.

FIG. 4 is a diagram illustrating a phased array line feed 260' for a reflector antenna that operates at a wavelength of interest λ according to another exemplary embodiment of the present invention.

Similar to the phased array line feed 260 illustrated in FIG. 3, the phased array line feed 260' includes a plurality of (e.g., 3 or more) substantially parallel metallic rods 320a-320c and a phase/power switching matrix 340, controlled by a computer 390, electrically connected to each of the metallic rods 320a-320c (e.g., via coaxial connectors 342). The radio 380 outputs signals for transmission by the phased array line feed 260' and receives signals received by the phased array line feed 260'. The phased array line feed 260' may also include a plurality of substantially parallel metallic disks 310a-310n. The metallic rods 320a-320c may pass through the metallic disks 310a-310n (e.g., via coaxial feedthroughs 322) perpendicular to the metallic disks 310a-310n. Again, the length of the phased array line feed 260' may be extended to approximately 12 percent (e.g., 12±1 percent) of the diameter of the spherical reflector being illuminated (e.g., the reflective surface 244) to intercept off-axis reflected rays.

In the embodiment illustrated in FIG. 4, diameters d of the metallic disks 310a-310n may be substantially equal. Similar to the phased array line feed 260 illustrated in FIG. 3, the metallic discs 310a-310n divide the phased array line feed 260' into a series of independent subarrays of λ/2 vertical antennas. In order for the emergent beam angles θ from each subarray to vary along the length of the phased array line feed 260' (e.g., from 19 degrees to 64 degrees), the distances between the metallic disks 310a-310n decrease from the base of the phased array line feed 260' to the vertex of the phased array line feed 260'.

Each of the phased array line feeds 260 and 260' create an electronically steerable beam that illuminates the surface of the reflector antenna (e.g., the reflective surface 244) without rotating the phased array line feed 260 or 260'. The phase/power switching matrix 340 steers the beam by adjusting the phase and/or power difference between the metallic rods 320a-320c.

A mathematical description of the resulting beam pattern from the phased array line feed 260 or 260' can be derived using the principle of pattern multiplication. Assuming the geometry of each radiating element in the array (here, a metallic rod 320 with metallic disks 310) is the same, then the combined radiation pattern may be prescribed, for example, by Equation 1:

$$f_a(\theta, \phi) = f_0(\theta, \phi) \sum_{n=1}^{N} V_n e^{jkd_n \sin\theta \cos\phi} \qquad \text{Eq. 1}$$

where $f_a(\theta, \phi)$=resulting radiation pattern
$f_0(\theta, \phi)$=common radiation pattern of each array element
$V_n = A_n e^{j\alpha_n}$=complex excitation to each element
$A_n$=signal amplitude at each element
$\alpha_n$=phase at each element
$d_n$=element spacing relative to center of array
$k = 2\pi/\lambda$=propagation constant
$\theta$=polar angle
$\phi$=azimuthal angle
$\lambda$=wavelength of operation
n=element number (e.g., 1, 2, 3, etc.)

The above expression for $f_a(\theta, \phi)$ may also be presented in vector form as shown, for example, in Equation 2. The normalized power pattern, $P_n(\theta, \phi)$, of the array is then:

$$P_n(\theta, \phi) = \frac{|f_a(\theta, \phi)|^2}{|f_{max}|^2} \quad \text{Eq. 2}$$

where
 $f_{max}$=maximum value of $f_a(\theta, \phi)$.

The computer 390 may be any suitable hardware computing device configured to control the beam angle of the phased array line feed 260 or 260'. The computer may include a processing unit (e.g., a central processing unit) and computer readable storage media (e.g., a hard disk, solid state memory, etc.). A single computer 390 may control all of the phased array line feed 260 or 260'. The computer 390 and each phase/power switching matrix 340 may combine to form beam steering electronics that control the beam of the corresponding phased array line feed 260 or 260'. For example, because the satellites 200 in the constellation 290 may travel along predictable orbital paths, the computer 390 may store a lookup table of the beam angle (e.g., azimuth and elevation) to the adjacent satellite 200 over time. The computer 390 may determine the time using a clock (not shown). The computer 390 may also store a lookup table of the phase and/or power settings for each metallic rods 320a-320c for each beam angle. Accordingly, computer 390 may steer the phased array line feed 260 or 260' by identifying the current beam angle to the current position of the currently adjacent satellite 200 and outputting the phase and/or power settings for each of the metallic rods 320a-320c to the phase/power switching matrix 340 for that beam angle.

After establishing contact with an adjacent cross-link satellite 200, the cross-link satellite 200 may use feedback from the adjacent cross-link satellite 200 to track the movement of the adjacent cross-link satellite 200 and maintain contact with that adjacent cross-link satellite 200.

Figure 5:
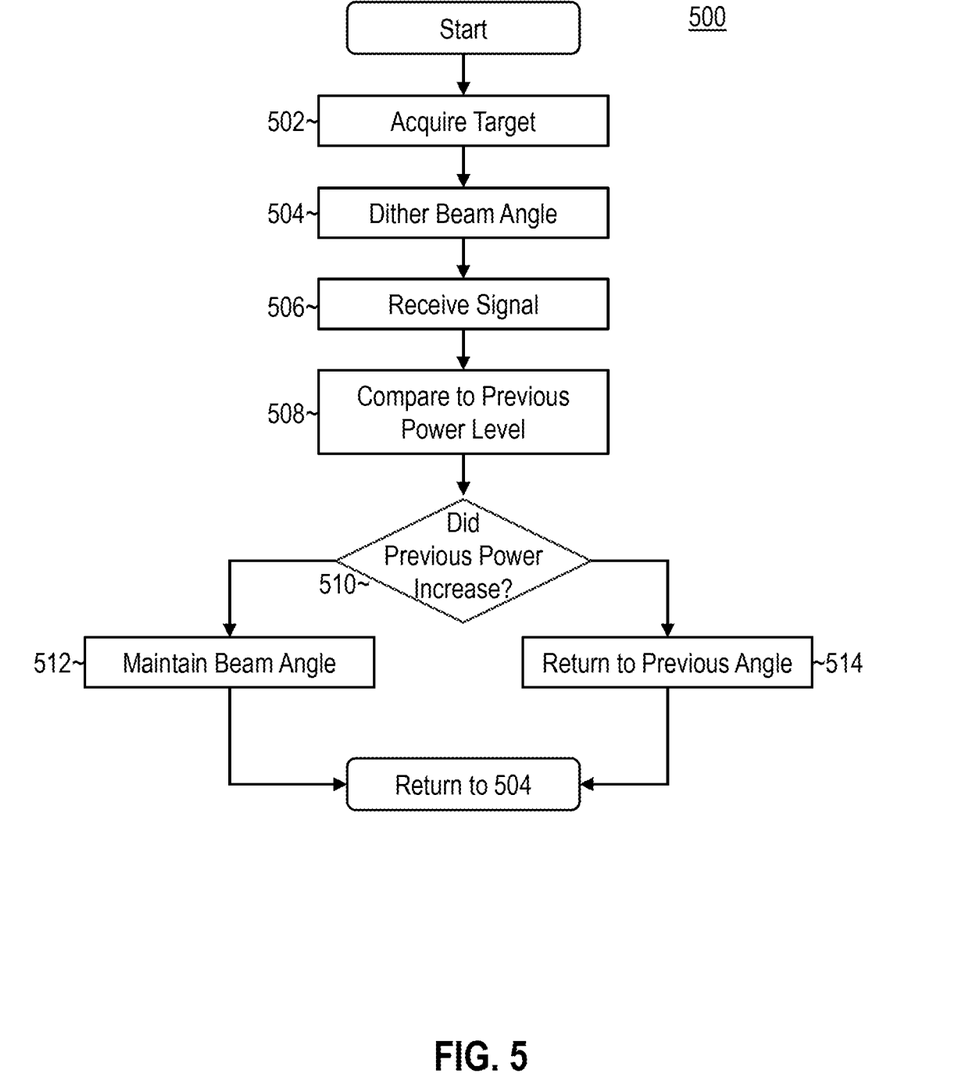
FIG. 5 is a flowchart illustrating an active steering process for tracking an adjacent cross-link satellite and maintaining contact with the adjacent cross-link satellite according to an exemplary embodiment.

FIG. 5 is a flowchart illustrating an active steering process 500 for tracking an adjacent cross-link satellite 200 and maintaining contact with the adjacent cross-link satellite 200 according to an exemplary embodiment.

Communication with the adjacent cross-link satellite 200 is established in step 502.

The beam angle is adjusted in step 504. The beam angle is adjusted such that the adjacent cross-link satellite 200 is still within the width of the beam, but that the center of the beam is slightly to the side (or above or below) the previously determined location of the adjacent cross-link satellite 200.

A signal is received from the adjacent cross-link satellite 200 in step 506.

In step 508, the power level of the signal received in step 506 is compared to the power level of the signal before the beam angle was adjusted in step 504.

In step 510, it is determined whether the power level increased after the beam angle was adjusted in step 506. If so (step 510: Yes), the adjusted beam angle is maintained. If not, (step 510: No), the beam angle is returned to the beam angle before it was adjusted in step 506.

Steps 504 through 514 are repeatedly performed, meaning the beam angle is repeatedly adjusted in step 504. The beam angle may be adjusted, for example, in a spiral pattern around the previously determined location of the adjacent cross-link satellite 200.

Repeatedly performing the active steering process 500 enables the cross-link satellite 200 to follow the trajectory of the adjacent cross-link satellite 200 and steer the beam to compensate for that trajectory.

If necessary, the cross-link satellite 200 may also use the active steering process 500 to steer the beam of the feed system 260e to follow the trajectory of a target on the ground based on the power levels of signals received from that target.

Referring back to FIG. 2B, each satellite 200 is capable of communicating with each of four adjacent satellites 200 in the constellation 290. Therefore, any satellite 200 can send information to any other satellite 200 in the constellation 290 (through intermediate satellites 200, if necessary). Meanwhile, each satellite 200 is also capable of communicating with the portion of the Earth's surface that is within its field of view. Furthermore, the constellation 290 may be such that each spot on the Earth's surface is within the field of view of at least one satellite 200. For example, the constellation 290 may include 66 cross-link satellites 200 in six orbital planes. Accordingly, a constellation 290 of cross-link satellites 200 may be capable of providing point-to-point communication from any two spots on the globe.

As described above, conventional satellites in conventional satellite constellations can cost $60-70 million to build and deploy. Meanwhile, the cost to build and deploy each cross-link satellite 200 is estimated to be about $1 million. Therefore, for the cost of a conventional satellite, an entire global constellation 290 of cross-link satellites 200 may be built and deployed.

The foregoing description and drawings should be considered as illustrative only of the principles of the inventive concept. Exemplary embodiments may be realized in a variety of sizes and are not intended to be limited by the preferred embodiments described above. Numerous applications of exemplary embodiments will readily occur to those skilled in the art. Therefore, it is not desired to limit the inventive concept to the specific examples disclosed or the exact construction and operation shown and described. Rather, all suitable modifications and equivalents may be resorted to, falling within the scope of this application.

The invention claimed is:

1. A cross-link satellite, comprising:
 a spherical balloon with a surface transparent to electromagnetic waves and three or more reflective surfaces, the three or more reflective surfaces comprising:
  a continuous reflective surface;
  a first polarized reflective surface substantially orthogonal to the continuous reflective surface; and
  a second polarized reflective surface opposite the first polarized reflective surface, the first polarized reflective surface and the second polarized reflective surface being orthogonally polarized; and
 a communications hub in the center of the spherical balloon.

2. The cross-link satellite of claim 1, wherein the communications hub receives electromagnetic waves reflected off each of the reflective surfaces and outputs electromagnetic waves that are reflected off each of the reflective surfaces.

3. The cross-link satellite of claim 1, wherein the communications hub is configured to communicate with the ground by receiving electromagnetic waves reflected off the continuous reflective surface and output electromagnetic waves that are reflected off the continuous reflective surface.

4. The cross-link satellite of claim 1, wherein the cross-link satellite is arranged in a satellite constellation and the communications hub is configured to communicate with a second cross-link satellite in the satellite constellation by:
receiving polarized electromagnetic waves from the second cross-link satellite that pass through the first polarized reflective surface and are reflected by the second polarized reflective surface; and
outputting polarized electromagnetic waves that are reflected by the second polarized reflective surface and pass through the first polarized reflective surface at a beam angle toward the second cross-link satellite.

5. The cross-link satellite of claim 4, wherein the communications hub comprises an electronically steerable feed system that receives the polarized electromagnetic waves from the second cross-link satellite and outputs the polarized electromagnetic waves toward the second cross-link satellite.

6. The cross-link satellite of claim 5, wherein:
the second polarized reflective surface has a line of focus; and
the electronically steerable feed system extends along one or more radial lines from a center of the spherical balloon and receives electromagnetic waves along the line of focus.

7. The cross-link satellite of claim 5, further comprising beam steering electronics that:
identify a direction from the cross-link satellite to the second cross-link satellite; and
adjust the beam angle of the electronically steerable feed system based on the direction from the cross-link satellite to the second cross-link satellite.

8. The cross-link satellite of claim 7, wherein the beam steering electronics repeatedly:
identify the direction from the cross-link satellite to the second cross-link satellite; and
adjust the beam angle of the electronically steerable feed system based on the direction from the cross-link satellite to the second cross-link satellite.

9. The cross-link satellite of claim 8, wherein the beam steering electronics:
store directions toward the closest satellite in a neighboring orbital plane at each point in time; and
identify the direction from the cross-link satellite to the second cross-link satellite based on the current time and the stored directions.

10. The cross-link satellite of claim 7, wherein the beam steering electronics repeatedly adjust the beam angle based on power levels of electromagnetic waves received from the second cross-link satellite.

11. The cross-link satellite of claim 10, wherein the beam steering electronics adjust the beam angle by repeatedly:
receiving a first signal from the second cross-link satellite at a first power level;
adjusting the beam angle;
receiving a second signal from the second cross-link satellite at a second power level;
determining if the second power level is greater than the first power level; and
maintaining or further adjusting the beam angle based on the determination.

12. The cross-link satellite of claim 11, wherein:
the first signal is received from the second cross-link satellite while the electronically steerable feed system is at a first beam angle;
the second signal is received from the second cross-link satellite while the electronically steerable feed system is at a second beam angle; and
the beam steering electronics maintains or further adjusts the beam angle by:
maintaining the second beam angle in response to a determination that the second power level is greater than the first power level; or
returning the beam angle to the first beam angle in response to a determination that the second power level is less than the first power level.

13. The cross-link satellite of claim 4, wherein the communications hub is configured to communicate with a third cross-link satellite in the satellite constellation by:
receiving polarized electromagnetic waves from the third cross-link satellite that pass through the second polarized reflective surface and are reflected by the first polarized reflective surface; and
outputting polarized electromagnetic waves that are reflected by the first polarized reflective surface and pass through the second polarized reflective surface toward the third cross-link satellite.

14. The cross-link satellite of claim 1, wherein the three or more reflective surfaces further comprise:
a third polarized reflective surface substantially orthogonal to the continuous reflective surface and the first polarized reflective surface; and
a fourth polarized reflective surface opposite the first polarized reflective surface, the third polarized reflective surface and the fourth polarized reflective surface being orthogonally polarized.

15. The cross-link satellite of claim 1, wherein the spherical balloon is collapsible such that it may be stowed in a deflated state and launched in the deflated state.

16. The cross-link satellite of claim 15, wherein the spherical balloon is configured such that the spherical balloon can be inflated while the cross-link satellite is in orbit.

17. A method comprising:
launching a cross-link satellite comprising:
a spherical balloon with a surface transparent to electromagnetic waves and three or more reflective surfaces, the three or more reflective surfaces comprising:
a continuous reflective surface;
a first polarized reflective surface substantially orthogonal to the continuous reflective surface; and
a second polarized reflective surface opposite the first polarized reflective surface, the first polarized reflective surface and the second polarized reflective surface being orthogonally polarized;
deploying the cross-link satellite in orbit;
receiving electromagnetic waves reflected off each of the reflective surfaces; and
outputting electromagnetic waves that are reflected off each of the reflective surfaces.

18. The method of claim 17, wherein the spherical balloon is launched in a collapsed state.

19. The method of claim 18, further comprising:
inflating the spherical balloon in orbit.

20. The method of claim 17, further comprising:
communicating with a second cross-link satellite by:
receiving polarized electromagnetic waves from the second cross-link satellite that pass through the first polarized reflective surface and are reflected by the second polarized reflective surface; and
outputting polarized electromagnetic waves that are reflected by the second polarized reflective surface and pass through the first polarized reflective surface toward the second cross-link satellite; and communicating with a third cross-link satellite in the satellite constellation by:
- receiving polarized electromagnetic waves from the third cross-link satellite that pass through the second polarized reflective surface and are reflected by the first polarized reflective surface; and
- outputting polarized electromagnetic waves that are reflected by the first polarized reflective surface and pass through the second polarized reflective surface toward the third cross-link satellite.

* * * * *